Figure 3:
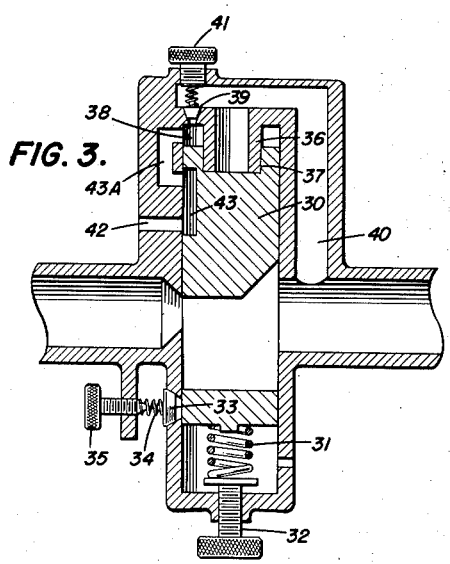

May 21, 1957  J. F. GULICK JR  2,793,075
CUT OFF AND REDUCING VALVE
Filed Oct. 10, 1955  2 Sheets-Sheet 1
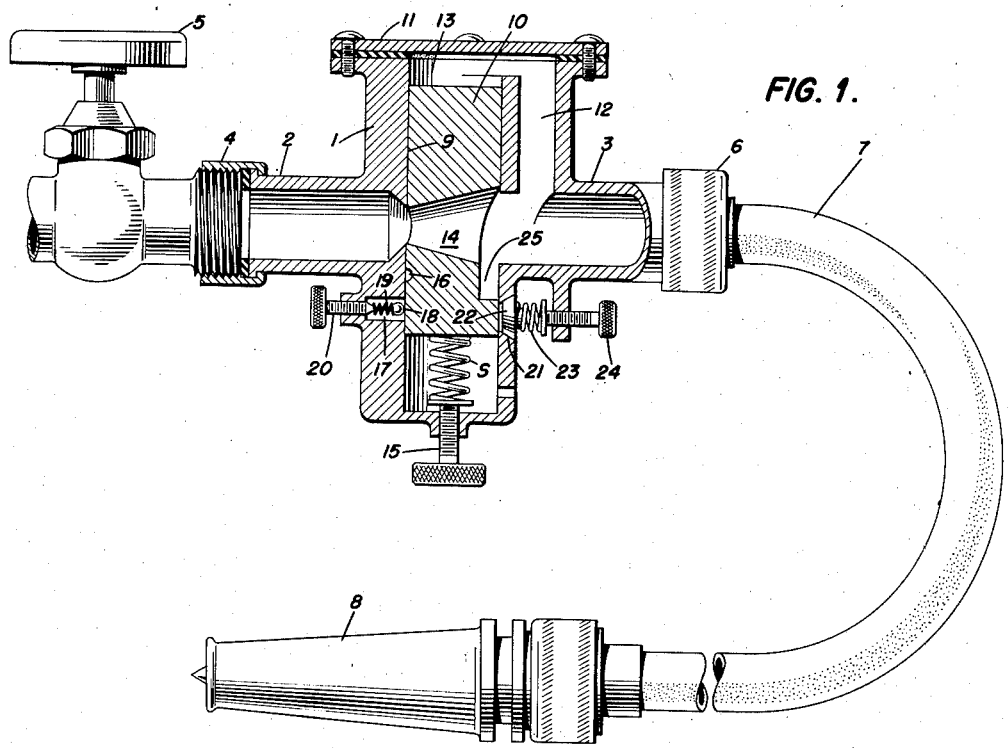
FIG. 1.
FIG. 2.
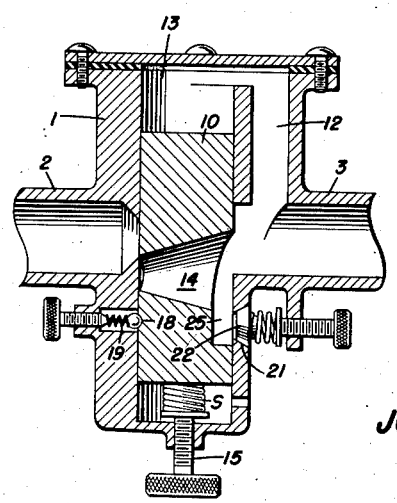
JOSEPH F. GULICK, JR.
INVENTOR
BY *Joseph F. Gulick*
ATTORNEY May 21, 1957  J. F. GULICK JR  2,793,075
CUT OFF AND REDUCING VALVE
Filed Oct. 10, 1955  2 Sheets-Sheet 2

JOSEPH F. GULICK, JR.
INVENTOR

BY *Joseph F. Gulick*
ATTORNEY 2,793,075
CUT OFF AND REDUCING VALVE

Joseph F. Gulick, Jr., Silver Spring, Md.

Application October 10, 1955, Serial No. 539,520

5 Claims. (Cl. 299—58)

This invention relates to valves and more particularly to cut off and reducing valves for use primarily with a water distribution system.

An object of the invention is to provide a valve for use primarily with a garden hose or sprinkler hose or similar conduit with means to shut off the water supply from a water connection simultaneously with a closing of a nozzle at the end of the hose and at the same time to reduce the water pressure in the hose to a predetermined minimum. In the sprinkling of flower beds and in the washing of cars it is often desirable and convenient to shut off the water by simply closing the hose nozzle. The water pressure often is in the nature of fifty or sixty pounds per square inch and sometimes more. This high pressure can and often does rupture or otherwise injure the hose. This is particularly true of plastic hose or other hose that has become weakened by age and usage.

The device of my invention removes the danger by reducing the pressure in the hose upon closing of the nozzle as well as cutting off the supply of water to the hose. Means are provided to reduce the pressure to any desired amount, perhaps to a few pounds per square inch.

Figure 4:
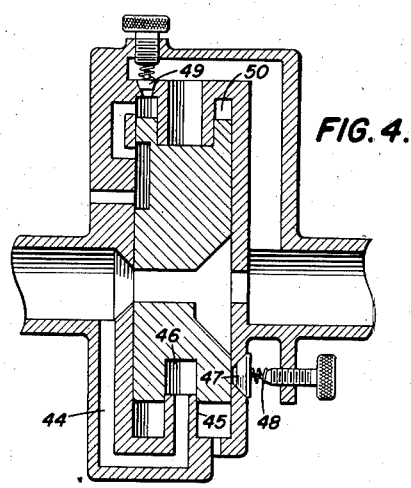
Figure 6:
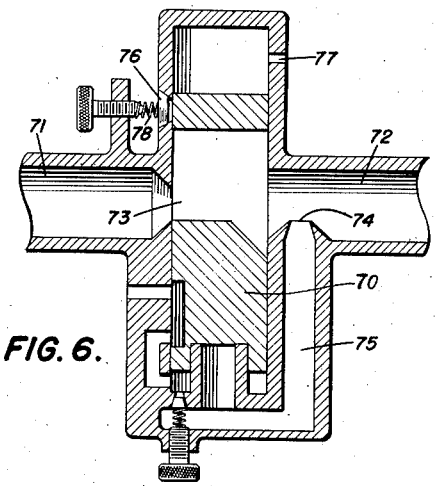
Figure 5:
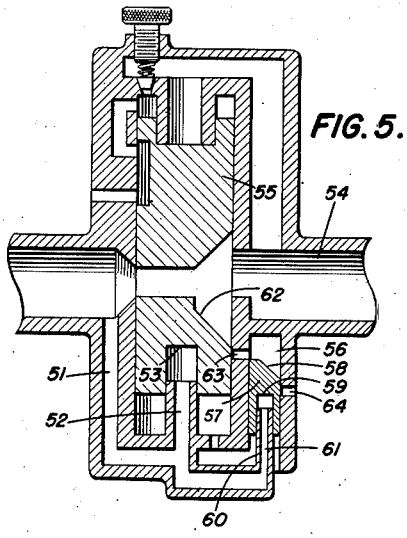

Other objects and advantages will become apparent from the description which follows:

In the drawings,

Fig. 1 is a view, partly in section, showing one form of the device showing the valve in combination with a water connection and a water hose, Fig. 2 is a view similar to Figure 1 but showing the cut off valve in closed position, Fig. 3 is a sectional view showing a modified form of valve, Figs. 4 and 5 are sectional views of still further modified forms of the cut off valve, and Fig. 6 is a sectional view showing still another form of the valve in which the valve is moved to open position by gravity.

In Figure 1 of the drawings numeral 1 indicates the body of the valve having inlet and outlet connections 2 and 3 respectively. The inlet 2 is provided with a conventional union 4 for connection to a water pipe having therein a cut off valve 5 and the outlet 3 is provided with a union 6 similar to union 4 for connection to a hose 7, the hose having a conventional nozzle 8.

The body of the valve is provided with a chamber 9 in which a piston valve 10 is slidably received. For convenience of assembly and to provide access to the chamber, a cover plate 11 may be secured at the end of the casing by conventional bolts secured to conventional flanges as shown. To prevent leakage a conventional packing element may be gripped between the flanges. The body portion is further provided with a passage 12 which connects the outlet 3 with a chamber 13 at the head of the piston 10. The piston 10 is also provided with a diametrical passage 14 adapted to connect the inlet 2 with the outlet 3, in which position water may flow freely from the inlet thru the valve to the hose. As shown the passage 14 may be flared outwardly from the inlet to the outlet. A spring s is seated at its lower end on an adjusting screw 15 and has its other end pressing upwardly on the lower end of the piston 10. The spring s tends to hold the valve 10 in open position as shown in Figure 1. One side of the piston near its lower end is provided with a pocket or indentation 16 and the inner wall of the chamber 9 is provided with a small chamber 17 in which is positioned a ball 18 against which seats a spring 19. The tension of this spring may be adjusted by a screw 20.

Another portion of the wall of the chamber 9 is provided with a valve seat 21 on which is seated a relief valve 22, this valve being held on its seat by a light spring 23 the tension of which may be adjusted by a screw 24. The outer end of the flared portion 14 is cut away to provide a passage 25. When the piston is in the position shown in Figure 1 the passage 25 terminates above the valve seat 21 but when the piston is moved to the position shown in Figure 2 the passage 25 connects the outlet passage with the relief valve 22.

Operation of the device as shown in Figure 1 is as follows: with the parts in the position shown in this figure, when the valve 5 is opened water may flow freely from the inlet to the outlet and to the hose. When the hose nozzle is closed pressure will instantly build up in the passage 12 and the chamber 13 and act upon the head of the piston 10, moving the piston down against the tension of the spring s bringing the piston to the position shown in Figure 2. In this position the inlet passage 2 is cut off and the chamber 25 brings the outlet passage 3 into communication with the relief valve 22 and thus relieves pressure in the hose. The spring 23 will be so tensioned as to leave a desired minimum pressure in the hose. When the piston is moved to its lowermost position the ball 18 will be spring pressed into the pocket 16 to hold the piston in this position. There will still be some pressure at the head of the piston in the chamber 13 so that the piston will be held in this position. When the nozzle is opened pressure will be relieved above the piston and the spring s will dislodge the ball 18 from its seat and permit the spring to move the piston to its uppermost position. The water flowing thru the outlet furthermore will tend to create a suction in the passage 12 and this will assist the spring s to move the piston up.

In the form of the invention shown in Figure 3 no holding spring, ball 18 and pocket 16 are necessary. In this form of the invention the piston 30 is moved upwardly to open position by a spring 31, adjustable by a screw 32. A relief valve 33, spring 34 and adjusting screw 35 are provided as in Figure 1.

In this form of the invention the upper section of the casing is provided with a depending cylindrical portion 36 which extends into a cylindrical chamber 37 in the upper end of the piston 30. A chamber 38 is provided above the piston head. A valve 39 may allow pressure to be relieved to the passage 40. The relief valve is held on its seat by a light spring and a plug 41 is provided to afford access to the valve 39 for installing it. The casing is provided with a relief port 42, a relieved portion 43a and the piston with a relieved portion 43 for permitting a bleed for any pressure which might build up in chamber 38 due to any leakage between cylindrical portion 36 and the walls of chamber 37.

In the operation of this form of the device, when the piston is in the position shown in the figure water may flow freely from the inlet to the outlet and to the hose. When the nozzle is closed pressure builds up in the passage 40. This pressure acts upon only a small area at the head of the piston, that within the cylindrical extension 36. This pressure is sufficient to move the piston. When the piston has moved down past the end of the extension 36 pressure will act on the whole end of the piston. When the piston moves down a flange on the end of the piston closes off the relief port 43 so that water cannot escape from the chamber 38 at the head of the piston. When the piston moves down pressure will be relieved from the outlet passage thru the relief valve 33 as in the other form. Though the pressure has been relieved, since it acts on the whole area at the head of the piston it will be sufficient to hold the piston down. The tension of the spring 31 may be adjusted so that this will occur.

When the nozzle is opened pressure will again be relieved in passage 40 so that the spring 31 will restore the piston to open position. When the piston has been moved up to the position shown in Fig. 3 any fluid in chamber 38 will leak out thru passages 43a, 43 and port 42. Furthermore water flowing through the outlet passage will create a slight suction in the passage 40.

In the modified form shown in Figure 4 no spring is necessary to move the valve to open position. The upper portion of the valve is the same as that shown in Figure 3. The lower portion of the valve is formed with a conduit or channel 44 one end of which connects with the inlet and the other end has an axial extension which fits in a hole 46 in the lower end of the piston. A relief valve 47 and adjusting spring 48 are the same as the relief valve shown in Figure 3.

The operation is as follows: When the nozzle is open pressure is relieved above the piston. Inlet pressure acting on the lower end of the piston will move the piston up to open position. When the nozzle is closed pressure acts on a larger area at the head of the piston than the area of the bore 46 and moves the piston to the cut off position. Pressure in the chamber 50 at the head of the piston will be relieved through relief valve 49 as in Figure 3. When the nozzle is again opened pressure will be relieved above the piston and pressure acting on the lower end of the piston will again raise it.

In the modified form shown in Figure 5 the upper end of the valve unit is the same as that shown in Figures 3 and 4. The valve is moved to open position in the same way as in Figure 4. Water from the inlet acts through channel 51, passage 52 upon the end 53 of a cylindrical bore in the bore end of the piston. In this form the relief valve is different since it requires no relief spring. In this form there is a cylindrical chamber 56 in the wall of the casing. A piston 57 is slidably positioned in this chamber. This piston is provided with a downwardly tapered upper end 58. The lower end of this piston is provided with a small cylindrical bore 59 which fits over a cylindrical extension 60 on the casing. This extension is provided with a small bore 61 which connects the inlet passage 51 with a chamber above the extension and beneath the piston 57. The piston 55 has a cut away portion 62. Relief ports 63 and 64 are provided from the main valve chamber and the chamber above the piston 57.

The operation is as follows: With the parts in the position shown in this figure water may flow freely from the inlet to the outlet. When the nozzle is closed pressure builds up at the head of the piston 55 and moves it down as in Figure 4. When the edge 62 uncovers the port 63 pressure acts on the head of the piston 57 and moves this piston down to uncover port 64 when pressure is relieved from the outlet passage. Although inlet pressure is acting on the lower end of the piston 57 it is acting on a small area so that the piston 57 can move down. When the pressure in the outlet from the valve has been reduced to a predetermined degree pressure below the piston 57 will prevent pressure from dropping to zero in the outlet passage. The area of the head of the piston 57 and the area at the head of the extension will be so related as to hold the piston 57 in balance.

In the form shown in Figure 6 the controlling piston valve 70 is moved to open position solely by gravity. The lower portion of the valve in this form is identical with that shown in Figures 3 and 4, but the valve is inverted from that shown in this figure. The figure can best be described by its operation.

The operation is as follows: with the hose nozzle open the control valve 70 will rest by gravity in the position shown in Figure 6. In this position water may flow freely from the inlet 71 to the outlet 72, through the diametrical passage 73 in the piston. A passage 75 will be connected at one end with the outlet passage at the throat of a venturi 74 in the outlet. Suction created in the passage 75 partly as a result of the venturi will insure that the piston is in its lowermost position when the water is flowing through the valve. When the nozzle is closed pressure builds up immediately beneath the piston and raises it, first cutting off the inlet so that water cannot flow to the hose and then moving the passage 73 to uncover the relief valve 76 which is held on its seat by an adjustable spring 78. A leakage port 77 is provided above the head of the piston.

While for simplicity of showing the Figures 2 to 6 are shown as single units, the casings of these figures can and will be made in sections bolted together as shown at the top of Figure 1.

While this invention has been described as for use primarily with a water hose it may also be used in an air hose. Wherever the term fluid is used it is intended that it may include air as well as liquid fluid.

While I have shown the invention as embodied in several different forms I am aware that many other variations of the basic invention can be made. I therefore do not limit myself to the specific forms of the device but only as set forth in the claims.

What I claim is:

1. In a fluid flow line, a valve unit having inlet and outlet connections for controlling flow of fluid through said line comprising a casing, a valve plunger therein, said plunger having a diametrical passage therethrough for connecting the inlet with the outlet, a fluid passage for connecting the inlet to a chamber at one end of the plunger with means whereby inlet pressure will act only upon a small area of the end of the plunger to move the plunger to a position where it will connect the inlet to the outlet, a fluid passage connecting the outlet to a chamber at the other end of the plunger with means to apply outlet pressure to a larger area than that at the other end of the plunger to move the plunger to a position to cut off flow through the unit when the pressure in the outlet reaches a predetermined amount and a spring closed relief valve for relieving pressure in the outlet when the plunger has moved to a cut off position.

2. In combination with a water connection having a cut off valve therein and a hose having a valved nozzle thereon, a valve unit adapted to be connected to said connection and to said hose, said valve unit having a control valve therein for controlling flow of water through the unit, means for normally holding the valve in position to permit flow of water through the unit but movable by pressure built up in the unit when the valved nozzle is closed to cut off the flow of water and means operating simultaneously with a cutting off of the flow of water through said unit to reduce pressure in the hose to a value substantially below the pressure in the water connection.

3. In a fluid flow line, a valve unit having inlet and outlet connections for connecting it to a fluid conduit and to a hose having a cut off valve thereon, means for controlling flow of fluid through said unit comprising a valve plunger having a diametrical passage therethrough for connecting the inlet with the outlet, means for urging the plunger to a position to connect the inlet with the outlet, a casing having a bore therein in which said plunger is operable, a passage in said casing connecting the outlet with a space above said plunger to move the plunger to a position to cut off flow of fluid from the inlet to the outlet when the pressure in the outlet exceeds a predetermined amount resulting from a closing of the cut off valve, a spring closed valve in the wall of said bore for relieving pressure in the outlet to a predetermined degree when the plunger has been moved to a position to cut off flow of fluid from the inlet to the outlet.

4. In combination with a water connection and a hose having a valved nozzle thereon, a valve casing having a valve chamber therein, a control valve reciprocable in said valve chamber and having means movable to control flow of water from the water connection to the hose, means for subjecting an area of said control valve to the pressure of water in the connection to move the valve into and hold it in position to permit flow of water through the casing, means for subjecting an opposite larger area on said valve to an increased pressure resulting from a closing of the valved nozzle to move the control valve to a position to cut off the flow of water through the casing, a spring closed relief valve port in the casing, the control valve having means thereon adapted to connect the interior of the hose with the relief port when the control valve is moved to a position to cut off the flow of water through the valve chamber.

5. A valve unit having a fluid flow passage therethrough adapted to connect a fluid under pressure with an outlet conduit having a cut off valve therein, means for controlling the flow of fluid through the passage comprising a valve plunger having a diametrical passage therethrough, said plunger being movable to connect and disconnect the fluid flow passage with the fluid under pressure, means for subjecting one area of said plunger to inlet pressure for moving the plunger into position to connect the diametrical passage with the fluid under pressure, means for subjecting a larger area of the plunger opposing the first named area to an increased fluid pressure in the outlet from the passage resulting from a closing of the cut off valve in the outlet conduit, to move the plunger to cut off flow of fluid through the diametrical passage, a relief valve for reducing pressure in the unit when the cut off valve in the outlet conduit is closed, a spring for holding said relief valve closed, means for tensioning said spring to maintain sufficient pressure on the said larger area of the plunger to hold the plunger in the cut off position when the pressure in the unit has been reduced to a predetermined value, the pressure on the said one area returning the plunger to the on position when the outlet pressure drops to a further predetermined value upon an opening of the cut off valve in the outlet conduit.

References Cited in the file of this patent

UNITED STATES PATENTS

| | | |
|---|---|---|
| 219,114 | Ross | Sept. 2, 1879 |
| 1,725,539 | Riley | Aug. 20, 1929 |
| 2,173,416 | Horstmann | Sept. 19, 1939 |
| 2,288,733 | Niesemann | July 7, 1942 |
| 2,314,071 | Bucknell | Mar. 16, 1943 |
| 2,701,704 | Lawrence | Feb. 8, 1955 |